A. B. TRIPLER.

Improvement in Railroad Ties.

No. 4,838. Reissued March 26, 1872.

Witnesses
Chas. E. Upperman
T. Upperman

Archibald B. Tripler.
By his Attorney
T. N. Upperman

THE NORRIS PETERS CO., WASHINGTON, D. C.

UNITED STATES PATENT OFFICE.

ARCHIBALD B. TRIPLER, OF PHILADELPHIA, PENNSYLVANIA, ASSIGNOR TO CHARLES E. TRIPLER.

IMPROVEMENT IN RAILROAD TIES.

Specification forming part of Letters Patent No. 104,917, dated June 28, 1870; reissue No. 4,838, dated March 26, 1872.

DIVISION B.

*To all whom it may concern:*

Be it known that I, ARCHIBALD B. TRIPLER, formerly of New Orleans, Louisiana, but now of Philadelphia, in the county of Philadelphia and State of Pennsylvania, have invented a certain new and useful Improvement in Railroad Ties, &c.; and I do hereby declare that the following is a full, clear, and exact description of the same, reference being had to the accompanying drawing which makes part of this specification, and in which—

Figure 1:
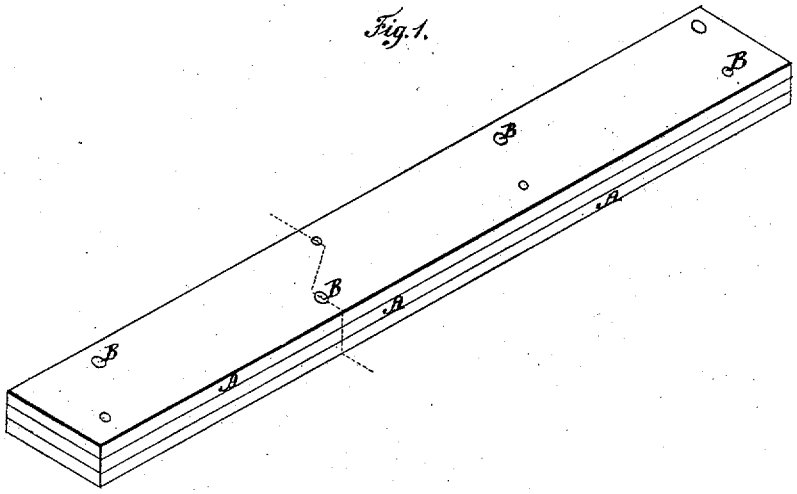
Figure 2:
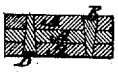

Figure 1 represents a view in perspective of a railroad cross-tie embracing my improvement. Fig. 2 is a transverse vertical section of the same.

My invention relates to ties, bed-sills, &c., for railroad purposes; and it consists in cutting the timber forming the same into two or more equal parts or slabs, boring them vertically at suitable distances throughout their length, and uniting the sections firmly together by tree-nails, dowel-pins, or the like, by which construction a tie is obtained which, while it possesses elasticity and all the strength, or more, of the solid tie in common use, is capable of being repaired by having a faulty section removed and a sound one placed in its stead, to the great saving of lumber, as will be further described.

In the accompanying drawing, the tie is represented as being composed of three slabs or laminæ A, firmly united by tree-nails or dowel-pins B, and they are prepared, by preference, as follows: The timber is run through a gang of the required number of saws and of sufficient distance apart to cut it into slabs of the desired thickness, when a number of the slabs are carried forward against a gang of augers, and thereby bored at equal distances, so that they match one with another. They are then firmly united by dowel-pins, and the timber being cut of the desired length, the tie thus constructed is ready to be laid in position on the road-bed without being hewn or otherwise dressed.

This construction of railroad tie possesses an advantage over the solid tie when it is desired to preserve it; but as this is the subject of an application for Letters Patent of even date herewith, it need not be particularly referred to here.

By constructing the tie in sectional slabs, as described, an elasticity is imparted to it which makes it far superior to the solid tie, as it thereby prevents the jumping of the spikes by the concussion of the wheels of the passing trains, and lessens the wear and tear of the rolling stock.

Another material advantage gained by the herein-described construction of tie is the readiness with which a faulty section can be removed and a sound one added, making the tie as perfect as a new one. This, in view of the increasing scarcity of railroad timber, and the fact that timber can be used in the construction of a sectional tie which would be unserviceable as a solid one, tend to establish the excellence of a tie as herein described, and prove a great saving in the cost of repairing a road where they are used.

Having described my invention, I claim—

A railroad tie composed of two or more sectional slabs or laminæ, and united together as herein described.

ARCHIBALD B. TRIPLER.

Witnesses:

FRED. DALY,

CHAS. E. UPPERMAN.